US012798880B2

(12) United States Patent
Yu et al.

(10) Patent No.: US 12,798,880 B2
(45) Date of Patent: Nov. 17, 2026

(54) TASK ASSIGNING METHOD, DEVICE, AND WAREHOUSING SYSTEM

(71) Applicant: SHENZHEN KUBO SOFTWARE CO., LTD, Shenzhen (CN)

(72) Inventors: Runfang Yu, Shenzhen (CN); Xin Al, Shenzhen (CN)

(73) Assignee: SHENZHEN KUBO SOFTWARE CO., LTD, Shenzhen (CN)

( * ) Notice: Subject to any disclaimer, the term of this patent is extended or adjusted under 35 U.S.C. 154(b) by 346 days.

(21) Appl. No.: 18/600,900

(22) Filed: Mar. 11, 2024

(65) Prior Publication Data

US 2024/0208731 A1 Jun. 27, 2024

Related U.S. Application Data

(63) Continuation of application No. PCT/CN2022/115971, filed on Aug. 30, 2022.

(30) Foreign Application Priority Data

Sep. 14, 2021 (CN) ......................... 202111076808.4

(51) Int. Cl.
*B65G 1/137* (2006.01)
*G06Q 10/08* (2023.01)

(52) U.S. Cl.
CPC ........... *B65G 1/1373* (2013.01); *G06Q 10/08* (2013.01)

(58) Field of Classification Search
CPC ...... B65G 1/1373; B65G 1/04; B65G 1/0492; G06Q 10/08; G06Q 10/087; Y02P 90/02
See application file for complete search history.

(56) References Cited

U.S. PATENT DOCUMENTS

2018/0043533 A1* 2/2018 Johnson ............... G06Q 10/047
2018/0060764 A1 3/2018 Hance et al.
(Continued)

FOREIGN PATENT DOCUMENTS

CN 105358455 A 2/2016
CN 108398924 A 8/2018
(Continued)

OTHER PUBLICATIONS

International Search Report for PCT/CN2022/115971 mailed Nov. 25, 2022 with English Translation.
(Continued)

*Primary Examiner* — Adam R Mott
*Assistant Examiner* — Sagar Kc
(74) *Attorney, Agent, or Firm* — Ladas & Parry, LLP

(57) ABSTRACT

Embodiments of this application provide a task assigning method, device, and a warehousing system. The task assigning method is applied to a warehousing system, a warehouse of the warehousing system includes a plurality of partitions, each partition includes one or more physical regions, and the method includes: determining to-be-scheduled goods corresponding to at least one task; determining, according to a partition corresponding to the to-be-scheduled goods and region attributes of robots, target robots for executing the at least one task, where the region attributes are used for describing partitions corresponding to the robots; and determining to-be-executed tasks of the target robots according to storage spaces corresponding to the to-be-scheduled goods, to complete the at least one task.

16 Claims, 8 Drawing Sheets

(56) References Cited

U.S. PATENT DOCUMENTS

| | | | | |
|---|---|---|---|---|
| 2018/0194556 | A1* | 7/2018 | Lert, Jr. | B65G 1/0492 |
| 2018/0364719 | A1 | 12/2018 | Wang et al. | |
| 2020/0005226 | A1* | 1/2020 | Sikka | G06Q 10/087 |
| 2020/0089237 | A1* | 3/2020 | Whitaker | G01C 21/206 |
| 2020/0202285 | A1* | 6/2020 | Elazary | G05D 1/0287 |
| 2023/0259878 | A1* | 8/2023 | Jacquemart | G06Q 10/087 705/28 |
| 2023/0399176 | A1* | 12/2023 | Fu | G05B 19/41865 |

FOREIGN PATENT DOCUMENTS

| | | | |
|---|---|---|---|
| CN | 108803590 | A | 11/2018 |
| CN | 109835651 | A | 6/2019 |
| CN | 110239868 | A | 9/2019 |
| CN | 110239873 | A | 9/2019 |
| CN | 111382969 | A | 7/2020 |
| CN | 112239043 | A | 1/2021 |
| CN | 112967002 | A | 6/2021 |
| CN | 113050549 | A | 6/2021 |
| CN | 113177765 | A | 7/2021 |
| CN | 113335811 | A | 9/2021 |
| CN | 113753462 | A | 12/2021 |
| JP | 2018150124 | A | 9/2018 |
| JP | 2020071740 | A | 5/2020 |
| JP | 6704157 | B1 | 6/2020 |
| JP | 2021520329 | A | 8/2021 |
| WO | WO2018168060 | A1 | 9/2018 |

OTHER PUBLICATIONS

Supplementary European Search Report in European patent application No. 22869031.9, issued on Dec. 3, 2024.

The Japanese Notice of Reasons for Refusal; dated Jun. 17, 2025 for Appln. No. 2024-515864.

The First Chinese Office Action dated Dec. 15, 2025 from Chinese Patent Appln. 202310318939.1, with search report.

Decision to Grant a Patent for Japanese Patent Application No. 2024-515864, issued on Dec. 23, 2025.

* cited by examiner

TASK ASSIGNING METHOD, DEVICE, AND WAREHOUSING SYSTEM

CROSS-REFERENCES

This application is a continuation of International Patent Application No. PCT/CN2022/115971 filed on Aug. 30, 2022, which claims priority to Chinese Patent Application No. 202111076808.4, filed on Sep. 14, 2021, which are incorporated herein by reference in their entireties.

TECHNICAL FIELD

This application relates to the field of intelligent warehousing technologies, and in particular, to a task assigning method, apparatus, and device, a warehousing system, and a storage medium.

BACKGROUND OF THE INVENTION

A robot-based warehousing system uses an intelligent operating system, and implements automated retrieval and storage of goods through system instructions; in addition, the system can operate 24 hours a day without interruption to replace manual management and operation, and therefor improves the efficiency of warehousing and has been widely applied and favored.

With continuous expansion of the area of a warehouse, a robot executing a warehousing order is also required to walk by a gradually prolonged distance, and consequently order processing efficiency is reduced. To increase the order processing efficiency, the warehouse is usually divided into a plurality of individual physical regions, and a group of robots are assigned to each physical region, to execute an order corresponding to the physical partition.

In the existing technology, when tasks are assigned to a robot, the robot is limited by a physical region, and consequently can process only a task in the corresponding physical region. As a result, task assigning flexibility is low, task processing efficiency is low, and demands cannot be satisfied.

SUMMARY OF THE INVENTION

This application provides a task assigning method, apparatus, and device, a warehousing system, and a storage medium, to increase partitioning flexibility in a logic partitioning manner, assign a task based on a logic partition corresponding to a robot, and increase task assigning flexibility and order processing efficiency.

According to a first aspect, an embodiment of this application provides a task assigning method. The method is applied to a warehousing system, a warehouse of the warehousing system includes a plurality of logic partitions, each logic partition includes one or more physical regions, and the method includes:

determining to-be-scheduled goods corresponding to at least one task; determining, according to a logic partition corresponding to the to-be-scheduled goods and a region attribute of each robot, target robots for executing the at least one task, where the region attribute is used for describing logic partitions corresponding to the robots; and determining to-be-executed tasks of the target robots according to storage spaces corresponding to the to-be-scheduled goods, to complete the at least one task, where the storage spaces are spaces that are used for storing the goods and that are in the logic partition.

Optionally, the determining, according to the logic partition corresponding to the to-be-scheduled goods and a region attribute of each robot, the target robots for executing the at least one task includes:

determining the logic partition corresponding to the to-be-scheduled goods as a target region; and determining the target robots for executing the at least one task among the robots of which region attributes include the target region.

Optionally, the determining the target robots for executing the at least one task among the robots of which the region attributes include the target region includes:

obtaining running states of the robots of which the region attributes include the target region; and determining, according to a task load of the at least one task and a task priority of the at least one task, the target robots for executing the at least one task among the robots of which the region attributes include the target region and of which running states are an order-receivable state.

Optionally, the region attribute includes a first attribute, the first attribute is used for describing a logic partition to which a robot belongs in a life cycle of the robot, and the first attribute is an unmodifiable attribute; the determining the target robots for executing the at least one task among the robots of which the region attributes include the target region includes:

obtaining running states of first robots of which first attributes are the target region; and determining, according to the running states of the first robots and a task load of the at least one task, the target robots for executing the at least one task.

Optionally, the region attribute further includes a second attribute, the second attribute is used for describing one or more logic partitions to which the robot belongs, and the second attribute is a modifiable attribute; and the determining, according to the running states of the first robots and the task load of the at least one task, the target robots for executing the at least one task includes:

determining, according to the task load of the at least one task, whether a first total order receiving load of first robots of which running states are an order-receivable state is less than the task load of the at least one task; if yes, obtaining a task priority of the at least one task; when the task priority is higher than a preset priority, determining the first robots of which the running states are the order-receivable state as first target robots, and obtaining running state of second robots of which second attributes include the target region; and determining, according to the task load of the at least one task and the first total order receiving load, at least one second robot of which a running state is the order-receivable state as a second target robot, to complete the at least one task through the first target robots and the second target robot.

Optionally, the region attribute further includes a third attribute, the third attribute is used for describing a logic partition that the robot is allowed to cross during single-trip running, and when a second total order receiving load of the first target robots and the second target robot is less than the task load of the at least one task, the method further includes:

obtaining running states of third robots of which third attributes include the target region; and determining, according to the second total order receiving load and the task load, at least one third target robot among third robots of which running states are the order-receivable state, to complete the at least one task through the first target robots, the second target robot, and the third target robot.

Optionally, the logic partition includes a first partition attribute, and the first partition attribute is used for describing the preset number of robots allowed to operate at the same moment in the logic partition; and the method further includes:

obtaining the operation number of robots that are operating in each logic partition corresponding to the to-be-scheduled goods; for each logic partition corresponding to the to-be-scheduled goods, when a sum of the total number of the target robots corresponding to the logic partition and the operation number is greater than the preset number corresponding to the first partition attribute of the logic partition, determining a first type of robots and a second type of robots among the target robots, where a sum of the number of the first type of robots and the operation number is equal to the preset number, and the second type of robots are target robots remaining after excluding the first type of robots; controlling the first type of robots to execute a corresponding to-be-executed task; and when it is detected that the first number of robots in the logic partition pull out from the logic partition, controlling the first number of the second type of robots to move to the logic partition and execute a corresponding to-be-executed task.

Optionally, the method further includes:

dividing physical regions of the warehouse according to locations of the storage spaces of the to-be-scheduled goods corresponding to the at least one task, to determine logic partitions of the warehousing system; and setting a region attribute of each robot according to the logic partitions.

Optionally, the determining the to-be-executed tasks of the target robots according to the storage spaces corresponding to the to-be-scheduled goods includes:

determining the to-be-executed tasks of the target robots according to aisles to which the storage spaces corresponding to the to-be-scheduled goods belongs, to enable a span of aisles corresponding to to-be-scheduled goods in a to-be-executed task of each target robot to be less than a preset value.

Optionally, before the determining the to-be-scheduled goods corresponding to the at least one task, the method further includes:

receiving an order; determining the at least one task according to the order; and determining one or more target work stations according to task demands of the at least one task, logic partitions corresponding to work stations, and goods storage statuses of the logic partitions, where goods satisfying the task demands of the at least one task are stored in a logic partition corresponding to the one or more target work stations.

Correspondingly, the determining the to-be-scheduled goods corresponding to the at least one task includes:

determining the to-be-scheduled goods of the at least one task in the logic partition corresponding to the target work station according to the task demands of the at least one task.

According to a second aspect, an embodiment of this application further provides a task assigning apparatus. The apparatus is applied to a warehousing system, a warehouse of the warehousing system includes a plurality of logic partitions, each logic partition includes one or more physical regions, and the apparatus includes:

a goods determining module, configured to determine to-be-scheduled goods corresponding to at least one task; a robot determining module, configured to determine target robots according to a logic partition corresponding to the to-be-scheduled goods and a region attribute of each robot, where the region attribute is used for describing logic partitions corresponding to the robots; and a task determining module, configured to determine to-be-executed tasks of the target robots according to storage spaces corresponding to the to-be-scheduled goods, to complete the at least one task, where the storage spaces are spaces that are used for storing the goods and that are in the logic partition.

According to a third aspect, an embodiment of this application further provides a task assigning device, including: a memory and at least one processor, where the memory stores computer-executable instructions; and the at least one processor executes the computer-executable instructions stored in the memory, to enable the at least one processor to perform the task assigning method according to any embodiment corresponding to the first aspect of this application.

According to a fourth aspect, an embodiment of this application further provides a warehousing system, including robots, a warehouse including a plurality of logic partitions, and the task assigning device according to the embodiment corresponding to the third aspect of this application.

According to a fifth aspect, an embodiment of this application further provides a computer-readable storage medium, where the computer-readable storage medium stores computer-executable instructions, and when a processor executes the computer-executable instructions, the task assigning method according to any embodiment corresponding to the first aspect of this application is performed.

According to a sixth aspect, an embodiment of this application further provides a computer program product, including a computer program, where when the computer program is executed by a processor, the task assigning method according to any embodiment corresponding to the first aspect of this application is performed.

Based on the task assigning method, apparatus, and device, the warehousing system, and the storage medium provided in the embodiments of this application, for a warehousing system including a plurality of logic partitions, the logic partition may include one or more physical partitions, and a warehouse of the warehousing system may be divided into a plurality of changeable regions in the form of logic partitions; and then when it is necessary to process at least one task, to-be-scheduled goods corresponding to the at least one task are first determined, then a robot is assigned to the at least one task based on a logic partition corresponding to the to-be-scheduled goods and a region attribute of each robot, and the corresponding robot executes the assigned task, thereby completing the at least one task. By setting a region attribute for each robot in advance, and assigning the robots for the task based on the region attributes and the logic partition corresponding to the goods corresponding to the task, task assigning flexibility is increased. In addition, through matching between the region attributes and the logic partitions, movement distances of the robots can be effectively reduced, for example, the robots are prevented from executing the task across the logic regions, thereby increasing task processing efficiency.

BRIEF DESCRIPTION OF DRAWINGS

Accompanying drawings herein are incorporated into the specification and constitute a part of this specification, show embodiments that conform to this application, and are used for describing a principle of this application together with this specification.

Specific embodiments of this application are shown by the above drawings, and more detailed description will be given below. These drawings and text description are not for limiting the scope of the concept of this application in any way, but for illustrating the concept of this application for those skilled in the art by referring to specific embodiments.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with this application. On the contrary, they are merely examples of apparatuses and methods consistent with some aspects of this application as detailed in the appended claims.

The following describes the technical solutions of this application and how to resolve the foregoing technical problems according to the technical solutions of this application in detail by using specific embodiments. The following specific embodiments may be combined with each other, and the same or similar concepts or processes may not be described in some embodiments. The following describes the embodiments of this application with reference to the accompanying drawings.

The application scenarios of the embodiments of this application are described below.

Figure 1:
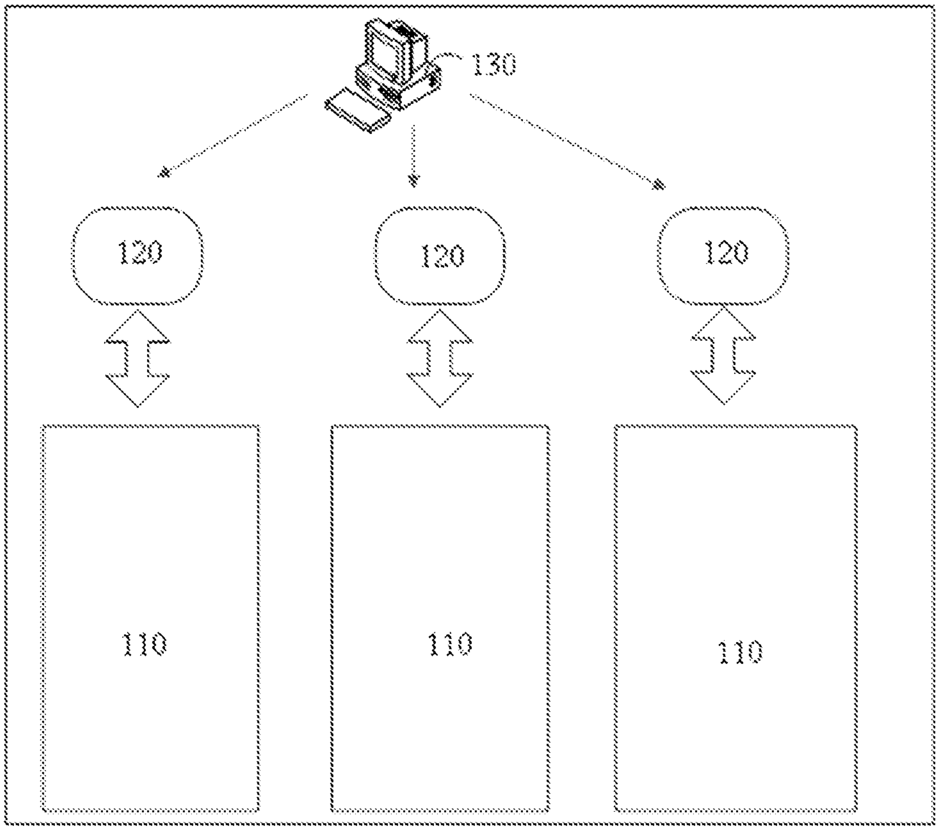
FIG. 1 is a diagram of an application scenario of a task assigning method according to an embodiment of this application.

FIG. 1 is a diagram of an application scenario of a task assigning method according to an embodiment of this application. As shown in FIG. 1, the task assigning method provided in this embodiment of this application may be executed by a task assigning device, and the task assigning device may be a scheduling device of a warehousing system, and may be in the form of a computer or server. As the warehousing capacity gradually increases, the coverage area of a warehouse of the warehousing system 100 is also increasing. To facilitate management, the warehouse is divided into a plurality of physical regions 110, to perform partition management, and one or more robots 120 are assigned to each physical region 110, to handle goods in the physical region 110. In FIG. 1, an example in which there are three physical regions 110 and each physical region 110 corresponds to one robot 120 is used. When the scheduling device 130 of the warehousing system 100 receives an order such as an outbound order or a sorting order, if a task load of the order is large, the order may be divided into a plurality of tasks, and therefore robots are assigned to the tasks corresponding to the order. During task assigning, it is necessary to assign the tasks based on the physical regions 110 corresponding to the robots 120, so that goods in the tasks corresponding to the physical regions 110 are handled by the robots 120 corresponding to the physical regions 110, to complete the order.

In the foregoing task assigning manner, because of being limited by the physical regions 110, task assigning flexibility is low. As a result, when goods corresponding to a task are mostly stored in a physical region 110, but each robot 120 in the physical region 110 is occupied by another task, or the number of robots 120 that can be used for the task is small, it will consume a long time to complete the task, and consequently task processing efficiency is low.

To increase task assigning flexibility and task processing efficiency, an embodiment of this application provides a task assigning method, and a main idea of the method is as follows: A warehouse of a warehousing system is partitioned in a logic partitioning manner, thereby implementing on-demand partitioning and increasing partitioning flexibility; and a region attribute is set for each robot in advance, to describe one or more logic partitions corresponding to the robots, and after to-be-scheduled goods corresponding to a task are determined, one or more robots matching region attributes are assigned to the task based on the logic partitions corresponding to the to-be-scheduled goods and the region attribute of each robot, thereby increasing task assigning flexibility through such two factors as the logic partitions and the region attributes, and increasing task processing efficiency.

Figure 2:
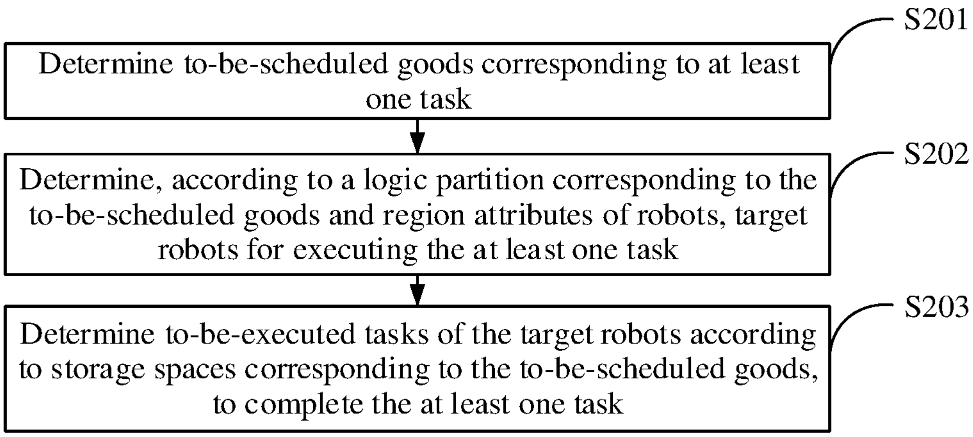
FIG. 2 is a flowchart of a task assigning method according to an embodiment of this application.

FIG. 2 is a flowchart of a task assigning method according to an embodiment of this application. As shown in FIG. 2, the task assigning method is applicable to a warehousing system, a warehouse of the warehousing system includes a plurality of logic partitions, each logic partition may include one or more physical regions, and the task assigning method may be executed by a task assigning device. The task assigning method provided in this embodiment includes the following steps:

Step S201: determining to-be-scheduled goods corresponding to at least one task.

The at least one task may be some or all tasks in an order received by the warehousing system, and the order may be an outbound order or a sorting order. For the outbound order, it requires to handle corresponding goods from storage locations in the warehouse to the outside of the warehouse, for example, goods exit. For the sorting order, it requires to perform sorting to obtain some or all items stored in corresponding goods, until the number of items corresponding to the order is satisfied, and then the items obtained through sorting are packaged and bounded out. The to-be-scheduled goods are corresponding goods in the at least one task.

Specifically, one or more tasks may be first determined, thereby determining to-be-scheduled goods based on task demands of the one or more tasks.

Further, to-be-scheduled goods may be determined according to items stored in goods stored in the warehousing system, the number of the items, and the task demands of the at least one task.

For example, assuming that goods 1 to 5 are respectively placed in storage locations 1 to 5 in the warehouse of the warehousing system, 2, 4, 5, 6, and 3 items A are respectively stored in the goods 1 to 5, and the task demands of the at least one task is 10 items A, it may be determined that the to-be-scheduled goods are the goods 2 stored in the storage location 2 and the goods 4 stored in the storage location 4, or the to-be-scheduled goods are the goods 1 stored in the storage location 1, the goods 3 stored in the storage location 3, and the goods 5 stored in the storage location 5.

Specifically, when goods are stored into the warehouse, the scheduling device of the warehousing system may update a stored storage record based on items stored in the goods, the number of the items, and storage locations in which the goods are stored, and therefore to-be-scheduled goods satisfying the task demands may be determined according to the storage record and the task demands of the at least one task.

Further, candidate goods in which corresponding target items are stored may be selected according to the target items of the task demands of the at least one task, and then to-be-scheduled goods are determined based on the required number of the target items in the task demands of the at least one task, the number of the target items in the candidate goods, and storage locations of the candidate goods, to enable the total number of the determined to-be-scheduled goods to be as small as possible and storage locations of the to-be-scheduled goods to be as close as possible, thereby reducing the number of picking times and the walking distance of the robot, and increasing task processing efficiency.

For example, assuming that the warehousing system includes two racks: a rack H1 and a rack H2, each rack includes five layers, each layer may be provided with 10 storage locations, the task demands of the at least one task is 100 pieces of clothing C, five cases in which the clothing C is stored in the warehousing system are included and are respectively cases B1 to B5, the cases B1 to B5 respectively store 16 pieces, 50 pieces, 40 pieces, 45 pieces, and 15 pieces of clothing C respectively, and the cases B1 to B5 are respectively in a storage location 22, a storage location 35, and a storage location 44 in the rack H1, and a storage location 11 and a storage location 56 in the rack H2, where in a serial number of a storage location, a first digit represents a layer at which the storage location is located and a second digit represents a column at which the storage location is located, and the storage location 22 represents a storage location at the second layer and the second column, the to-be-scheduled goods are determined as the case B1 to the case B3, so that the cases are concentrated on the rack H1, thereby avoiding a case that the robot needs to move to the rack H1 and the rack H2 separately during picking, and reducing the walking journey of the robot.

Step S202: determining, according to a logic partition corresponding to the to-be-scheduled goods and region attributes of robots, target robots for executing the at least one task.

The region attribute is used for describing one or more logic partitions corresponding to the robots.

In the warehouse of the warehousing system at which this application is targeted, a region is divided by using logic partitions. In some embodiments, a logic partition may be a changeable partition. For example, physical regions corresponding to logic partitions may be changed based on a current warehousing status or order demands.

Figure 3:
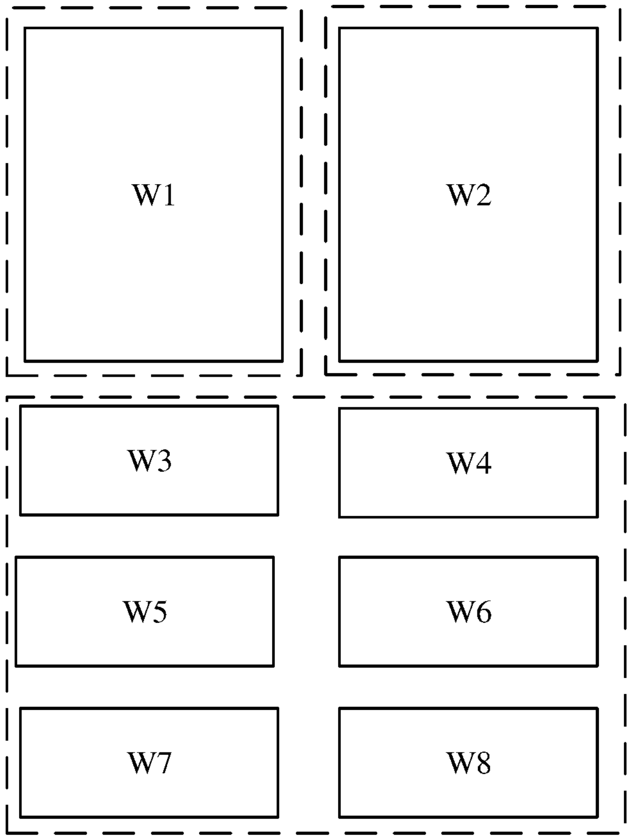
FIG. 3 is a schematic diagram of a status of a logic partition of a warehouse according to an embodiment of this application.
Figure 4:
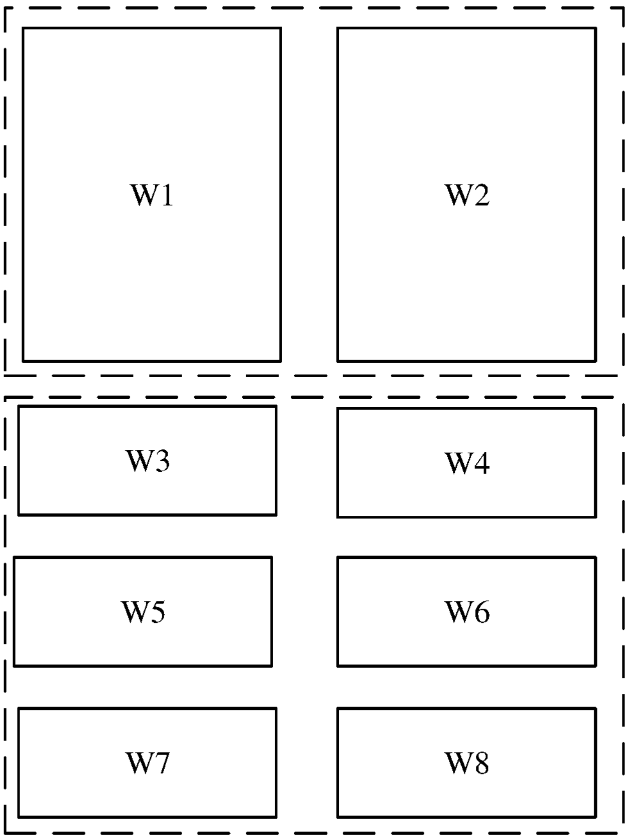
FIG. 4 is a schematic diagram of a status of a logic partition of a warehouse according to another embodiment of this application.

For example, FIG. 3 is a schematic diagram of a status of a logic partition of a warehouse according to an embodiment of this application, and FIG. 4 is a schematic diagram of a status of a logic partition of a warehouse according to another embodiment of this application. FIG. 3 and FIG. 4 correspond to the same warehouse. It can be learned with reference to FIG. 3 and FIG. 4 that, the warehouse includes a total of eight physical regions that are respectively W1 to W8. In FIG. 3, the warehouse is divided into three logic partitions, where the logic partition is represented using a dashed-line block. In FIG. 4, the warehouse 300 is divided into two logic partitions, where the logic partition is represented using a dashed-line block.

In some embodiments, when a total task load of the at least one task is small, there may be one target robot.

For the warehousing system partitioned using logic partitions, when matching robots for tasks, that is, determining target robots for executing the at least one task, target robots for executing the at least one task may be determined according to a logic partition in which the to-be-scheduled goods are located and region attributes of robots.

Specifically, it may be determined that robots whose region attributes include a logic partition corresponding to at least one piece of to-be-scheduled goods are the foregoing target robots, and therefore the target robots perform a task corresponding to to-be-scheduled goods in a logic partition in which to-be-scheduled goods corresponding to the region attributes of the target robots are located.

Optionally, the determining, according to the logic partition corresponding to the to-be-scheduled goods and the region attributes of the robots, the target robots for executing the at least one task includes:

- determining the logic partition corresponding to the to-be-scheduled goods as a target region; and determining the target robots for executing the at least one task among the robots of which the region attributes include the target region.

That the region attribute includes the target region may be understood as that the region attribute includes at least one logic partition in the target region.

Specifically, statistics may be collected on logic partitions corresponding to the to-be-scheduled goods, thereby obtaining one or more target regions.

Further, it may be determined that robots whose region attributes include at least one target partition are candidate robots, and then one or more target robots for executing the at least one task are determined among the candidate robots.

Specifically, one or more target robots may be determined among the candidate robots according to a logic partition corresponding to a region attribute of the candidate robots, the number of idle layers of a temporary storage rack of the candidate robots, and the total number of to-be-scheduled goods.

Specifically, a region attribute of a robot may be set in advance based on a logic partition status of the warehousing system.

For example, the warehouse of the warehousing system includes two logic partitions: a logic partition L1 and a logic partition L2, an order received by the warehousing system is divided into a plurality of tasks, and to-be-scheduled goods corresponding to a task that needs to be processed currently are five pieces of goods in the logic partition L1 and eight pieces of goods in the logic partition L2. The warehousing system includes a total of five robots: robots R1 to R5. Robots whose region attributes include the logic partition L1 are robots R1 to R3, and robots whose region attributes include the logic partition L2 are robots R3 to R5, that is, the robot R3 may process the task corresponding to the logic partitions L1 and L2. A temporary storage rack of each of the robots R1 to R5 includes 5 layers, the numbers of idle layers of the temporary storage racks of the robots R1 to R5, that is, the numbers of layers at which goods may be stored, are: 3, 2, 4, 4, and 3. For the foregoing situation, when robots are assigned to the current task, target robots may be the robots R1 to R4, where the robots R1 and R2 are used for processing the five pieces of goods in the logic partition L1, and the robots R3 and R4 are used for processing the eight pieces of goods in the logic partition L2.

Step S203: determining to-be-executed tasks of the target robots according to storage spaces corresponding to the to-be-scheduled goods, to complete the at least one task.

The storage spaces are spaces for storing to-be-scheduled goods on a rack in the warehouse, and may also be referred to as storage locations.

Specifically, after to-be-scheduled goods corresponding to the at least one task are determined, storage spaces or storage locations corresponding to the to-be-scheduled goods may be determined based on goods identifiers of the to-be-scheduled goods. After the storage spaces corresponding to the to-be-scheduled goods are obtained, a to-be-executed task is planned for each target robot based on locations of the storage spaces, to enable the storage spaces of the to-be-scheduled goods corresponding to the to-be-executed task of each target robot to be as concentrated as possible or enable the storage spaces of the to-be-scheduled goods to be as close as possible, thereby reducing a journey or distance that the target robot walks when executing the corresponding to-be-executed task, and increasing task processing efficiency.

Further, to-be-executed tasks of the target robots may be determined according to current locations of the target robots, the number of idle layers on the temporary storage rack, and the storage spaces of the to-be-scheduled goods.

In some embodiments, the to-be-scheduled goods may be stored in a plurality of logic partitions. Therefore, when determining the to-be-executed tasks of the target robots, the to-be-executed tasks of the target robots may be further determined with reference to the logic partitions included in the region attributes of the target robots, to process, through the target robots, one or more pieces of to-be-scheduled goods stored in the logic partitions included in the region attributes of the target robots.

For example, the warehousing system includes five logic partitions, that is, logic partitions L21 to L25, and logic partitions that to-be-scheduled goods involve are L22, L23, and L25, where the logic partition L22 includes nine pieces of to-be-scheduled goods, the logic partition L23 includes eight pieces of to-be-scheduled goods, and the logic partition L25 includes three pieces of to-be-scheduled goods. Target robots are robots R21 to R28. Table 1 is a table of a correspondence between region attributes of the target robots and logic partitions, and the logic partitions included in the region attributes of the target robots are shown in Table 1. In addition, the numbers of idle layers of temporary storage racks of the robots R21 to R28 are respectively: 2, 3, 2, 3, 3, 2, 4, and 5. Therefore, the nine pieces of to-be-scheduled goods in the logic partition L22 may be processed by R21 to R24, the eight pieces of to-be-scheduled goods in the logic partition L23 may be processed by R25 to R27, and the three pieces of to-be-scheduled goods in the logic partition L25 may be processed by R28. The to-be-executed tasks of the target robots may be specifically assigned based on the numbers of the idle layers of the temporary storage racks of the target robots.

TABLE 1

Table of a correspondence between region attributes of target robots and logic partitions

| Target robot | Logic partitions included in region attributes |
|---|---|
| R21 | L22 |
| R22 | L22 |
| R23 | L22 |
| R24 | L22 and L23 |
| R25 | L23 |
| R26 | L23 |
| R27 | L23 and L25 |
| R28 | L25 |

Based on the task assigning method provided in this embodiment of this application, for a warehousing system including a plurality of logic partitions, the logic partition may include one or more physical partitions, and a warehouse of the warehousing system may be divided into a plurality of changeable regions in the form of logic partitions; and then when at least one task needs to be processed, to-be-scheduled goods corresponding to the at least one task are first determined, then a robot is assigned to the at least one task based on a logic partition corresponding to the to-be-scheduled goods and a region attribute of each robot, and the corresponding robot executes the assigned task, thereby completing the at least one task. By setting a region attribute for each robot in advance, and assigning the robots for the task based on the region attributes and the logic partition corresponding to the goods corresponding to the task, task assigning flexibility is increased. In addition, through matching between the region attributes and the logic partitions, movement distances of the robots can be effectively reduced, for example, the robots are prevented from executing the task across the logic regions, thereby increasing task processing efficiency.

Figure 5:
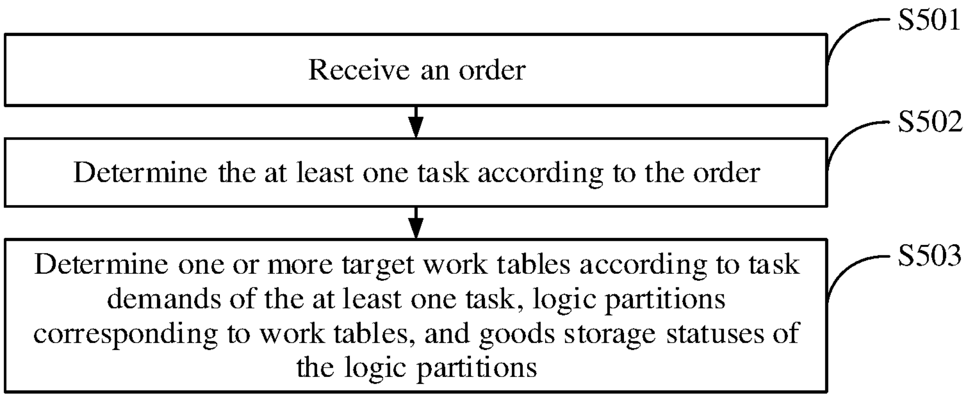
FIG. 5 is a flowchart of a task assigning method according to another embodiment of this application.

Optionally, FIG. 5 is a flowchart of a task assigning method according to another embodiment of this application. Based on the embodiment shown in FIG. 2, before step S201, that is, before the determining the to-be-scheduled goods corresponding to the at least one task, the following steps are added to this embodiment:

Step S501: receiving an order.

The order may be initiated by a customer or obtained through an order receiving device, or may be obtained by scanning an order two-dimensional barcode of the order customer through a handheld electronic device. The order may be an outbound order or a sorting order, the outbound order is to bound out specified goods, and the sorting order is to bound out a specified number of specified items.

Step S502: determining the at least one task according to the order.

A total sum of task demands of the at least one task is consistent with order demands of the order.

Specifically, after receiving an order, the task assigning device or the scheduling device may perform information extraction on the order, thereby obtaining order demands of the order, and then determine one or more tasks based on the order demands of the order.

Further, when the order is a sorting order, at least one task may be determined according to items corresponding to the order. For example, the order is divided according to each item's type, storage attributes, and the required number, to obtain tasks.

For example, it is assumed that the order is to bound out 100 pieces of clothing C5, 50 pieces of clothing C6, and 200 pairs of shoes X5, where storage attributes of both the clothing C5 and the clothing C6 are a first attribute, and items with the same storage attribute may be stored in one case together. Therefore, the order may be divided into two tasks, where one task is to bound out the 100 pieces of clothing C5 and the 50 pieces of clothing C6, and the other task is to bound out the 200 pairs of shoes X5.

Step S503: determining one or more target work stations according to task demands of the at least one task, logic partitions corresponding to work stations, and goods storage statuses of the logic partitions.

Goods satisfying the task demands of the at least one task are stored in a logic partition corresponding to the one or more target work stations. The goods storage status of the logic partition may include goods stored in storage locations of the logic partition, and may further include items stored in goods stored in the storage locations and the number of the items.

In some embodiments, one work station may correspond to one or more logic partitions, and one logic partition may also correspond to one or more work stations.

Specifically, after at least one task is determined, it is necessary to determine a target work station for processing the at least one task. If goods satisfying all task demands of at least one task are stored in one or more logic partitions corresponding to one workstation, the work station is preferentially determined as a target workstation. To be specific, work stations of which the work station number is minimum and of which the goods storage status of the corresponding logic partition satisfies the task demands of the at least one task are preferentially selected as target work stations, to reduce the number of the target work stations, and avoid a case that excess work stations are occupied to affect processing of other tasks.

Correspondingly, step S201 is specifically: determining the to-be-scheduled goods of the at least one task in the logic partition corresponding to the target work station according to the task demands of the at least one task.

Specifically, after the target work station is determined, the to-be-scheduled goods may be determined in the logic partition corresponding to the one or more target work stations according to the task demands of the at least one task.

Further, when the order is a sorting order, that is, the task is a sorting task, the to-be-scheduled goods may be determined based on storage locations, in which goods are stored, that include items in task demands, and that are in the logic partition corresponding to the target workstation, and the number of the items stored in the goods, to enable the storage locations of the to-be-scheduled goods to be as close as possible and enable the total number of the to-be-scheduled goods to be as small as possible.

For example, the warehouse of the warehousing system includes three logic partitions and two work stations, task demands of at least one task is to bound out 120 pieces of clothing C31 and 100 pieces of clothing C32, and the logic partitions are L31 to L33, where the logic partitions L31 and L32 correspond to a work station O31, the logic partition L33 corresponds to a work station O32, the logic partition L31 stores three pieces of goods that are respectively loaded with 100 pieces of clothing C31, 50 pieces of clothing C32, and 36 pieces of clothing C31, the logic partition L32 stores two pieces of goods that are respectively loaded with 67 pieces of clothing C31 and 86 pieces of clothing C32, and the logic partition L33 stores one piece of goods that is loaded with 100 pieces of clothing C31 and 15 pieces of clothing C32. Because the numbers of clothing C31 and clothing C32 stored in logic partitions corresponding to the work station O31, that is, the logic partition L31 and the logic partition L32 satisfy the task demands of the foregoing task, it may be determined that the work station O31 is a target workstation, and the to-be-scheduled goods may be the three pieces of goods stored in the logic partition L31 and the goods that are loaded with the 86 pieces of clothing C32 and that are stored in the logic partition L32.

Figure 6:
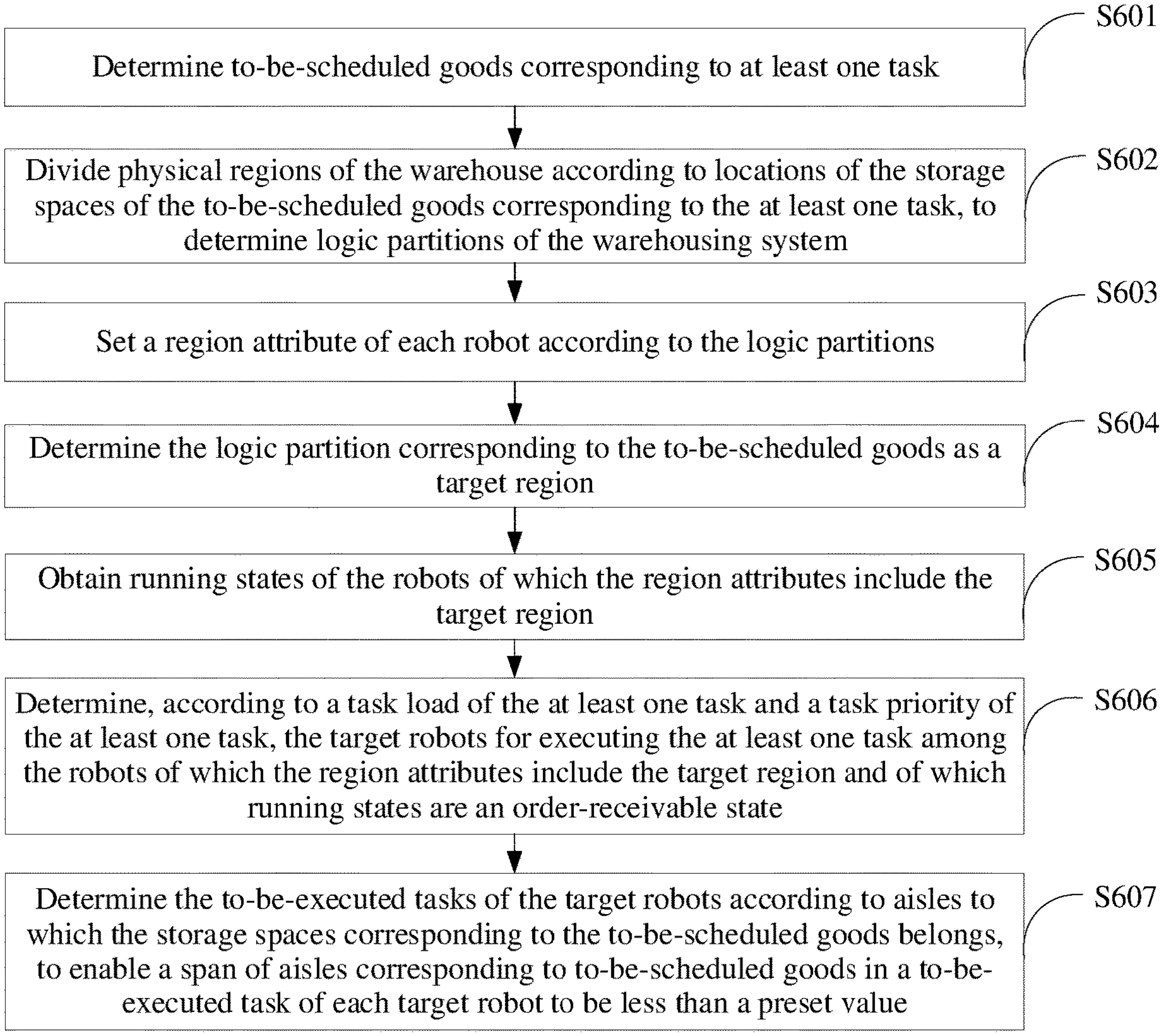
FIG. 6 is a flowchart of a task assigning method according to another embodiment of this application.

FIG. 6 is a flowchart of a task assigning method according to another embodiment of this application. In the task assigning method provided in this embodiment, steps S202 and S203 are further detailed based on the embodiment shown in FIG. 2, and steps of dividing a logic partition and setting a region attribute of a robot are added after step S201. As shown in FIG. 6, the task assigning method provided in this embodiment may include the following steps:

Step S601: determining to-be-scheduled goods corresponding to at least one task.

Specifically, when task demands of the at least one task are goods demands or tote demands, that is, when goods or totes that need to be processed are executed, corresponding goods or totes in the task demands may be directly determined as to-be-scheduled goods.

Specifically, when the task demands of the at least one task are item demands, to-be-scheduled goods satisfying the task demands may be determined according to a storage status of the warehouse of the warehousing system. Usually, items are placed in goods or cases, and the goods or the cases are placed in corresponding storage spaces or storage locations in the warehouse.

Step S602: dividing physical regions of the warehouse according to locations of the storage spaces of the to-be-scheduled goods corresponding to the at least one task, to determine logic partitions of the warehousing system.

Specifically, after the to-be-scheduled goods are determined, storage locations or storage spaces of the to-be-scheduled goods may be determined based on a goods identifier, and then physical regions of the warehouse are divided based on locations of the storage spaces or storage locations of the to-be-scheduled goods, that is, based on a distribution status of the to-be-scheduled goods, thereby obtaining logic partitions. The goods identifier may be in the form of a two-dimensional barcode, a barcode, a code, or the like, and is used for uniquely identifying the goods.

Further, based on the locations of the storage spaces of the to-be-scheduled goods, a principle of dividing physical regions should enable close to-be-scheduled goods to be distributed into the same logic partition as much as possible or logic partitions of which the number is as small as possible.

Figure 7:
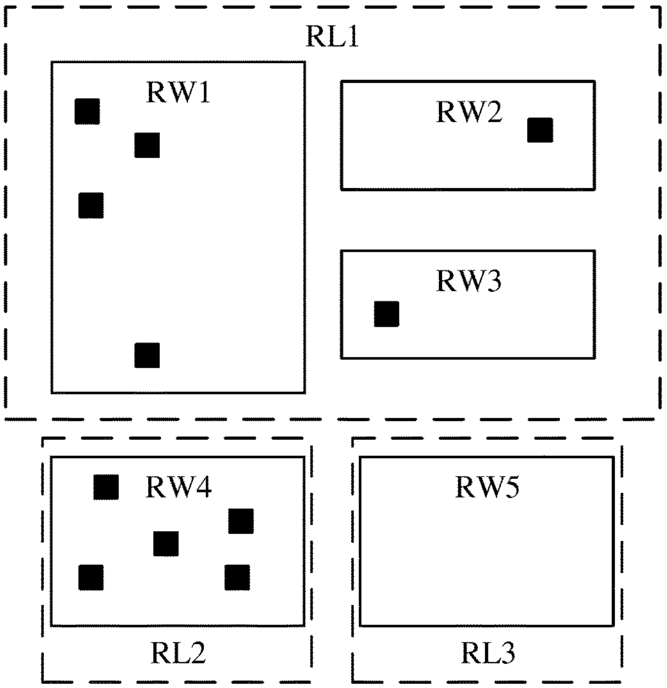
FIG. 7 is a schematic diagram of division of logic partitions in the embodiment shown in FIG. 6 of this application.

For example, FIG. 7 is a schematic diagram of division of logic partitions in the embodiment shown in FIG. 6 of this application. As shown in FIG. 7, the warehouse of the warehousing system includes five physical regions, that is, RW1 to RW5, and the to-be-scheduled goods are represented using solid blocks, of which distribution details are shown in FIG. 7. Therefore, the physical regions of the warehouse may be divided into three logic regions, that is, RL1, RL2, and RL3, and a specific division result is shown in FIG. 7.

Step S603: setting a region attribute of each robot according to the logic partitions.

Specifically, the total number of robots that can be used for handling goods in the warehousing system is determined. After logic partitions are obtained, region attributes may be set for the robots based on factors such as the coverage area of the logic partitions, locations of the logic partitions, and the number of corresponding storage spaces or storage locations.

In some embodiments, the region attributes may include unmodifiable attributes and modifiable attributes, and may include attributes of a value setting type and attributes of a switch setting type.

Specifically, the region attribute may include an unmodifiable first attribute, used for describing a corresponding logic region of a robot in a life cycle of the robot; and may further include a modifiable second attribute, used for describing a specified logic region corresponding to a robot. Each of the first attribute and the second attribute is of the value setting type. The region attribute may further include a third attribute of the switch setting type, which may be used for describing whether a robot is allowed to cross logic partitions during single-trip running.

When target robots are assigned to to-be-scheduled goods corresponding to each logic partition, a robot whose first attribute includes the logic partition should be preferentially considered, then a robot whose second attribute includes the logic partition is considered, and then a robot with a third attribute of being allowed to cross logic partitions is considered. To be specific, the target robots in the logic partitions corresponding to the to-be-scheduled goods are determined according to a sequence of the first attribute, the second attribute, and the third attribute.

Step S604: determining the logic partition corresponding to the to-be-scheduled goods as a target region.

Specifically, statistics may be collected on logic partitions corresponding to the to-be-scheduled goods, thereby obtaining one or more target regions.

For example, target regions may be determined in a traversal manner. Specifically, a logic partition corresponding to a first piece of to-be-scheduled goods may be first obtained, and the logic partition is determined as one of the target regions. Then, a logic partition corresponding to a second piece of to-be-scheduled goods is obtained. When the logic partition is different from each previously obtained logic partition, the logic partition is determined as one of the target regions, and the rest can be deduced by analogy, until all to-be-scheduled goods are traversed.

Step S605: obtaining running states of the robots of which the region attributes include the target region.

The running state may include an order-receivable state and an order-unreceivable state. In the order-receivable state, at least one layer of a temporary storage rack of a robot is an idle layer and the order receiving attribute is order-receivable. In the order-unreceivable state, the order receiving attribute of the robot is order-unreceivable, or each layer of the temporary storage rack is occupied, for example, occupied by goods in other tasks.

Specifically, a robot may detect storage statuses of layers of a temporary storage rack of the robot, and then a running state of the robot is determined based on an order receiving attribute of the robot and the storage statuses of the layers of the temporary storage rack.

Step S606: determining, according to a task load of the at least one task and a task priority of the at least one task, the target robots for executing the at least one task among the robots of which the region attributes include the target region and of which running states are an order-receivable state.

The task priority may be determined based on a deadline of the order corresponding to the task or a deadline of the task, and a closer deadline indicates a higher task priority of the task.

Specifically, a batch attribute of the at least one task may be determined based on the task load of the at least one task and the task priority of the at least one task, the batch attribute is used for describing whether the at least one task is allowed to be executed in batches, and execution in batches is to divide the at least one task into at least two batches. After the target robots of the at least one task are determined, the target robots first execute the task in a first batch, the robots handle the task in the first batch to a corresponding work station or target work station and then execute the task in a second batch, and the rest can be deduced by analogy.

In some embodiments, a batch attribute of a task whose task priority is higher than a preset level may be set to being disallowed to be executed in batches.

Further, a remaining execution time of the at least one task may be determined based on a deadline of the at least one task, and then a batch attribute of the at least one task is determined based on the remaining execution time and the task load of the at least one task.

Specifically, the target robots for executing the at least one task are determined, based on the batch attribute of the at least one task, among the robots of which the region attributes include the target region and of which running states are an order-receivable state.

Specifically, when the batch attribute is being disallowed to be executed in batches, the target robots for executing the at least one task may be determined, according to the number of to-be-scheduled goods corresponding to the target regions, among the robots of which the region attributes include the target region and of which running states are an order-receivable state, to enable the determined target robots to handle the to-be-scheduled goods to a corresponding work table in one batch.

Further, when the batch attribute is being allowed to be executed in batches, a remaining execution time of the at least one task may be determined based on a deadline of the at least one task, and then the at least one task is divided based on the remaining execution time and the task load of the at least one task, to obtain task loads corresponding to batches. Then, for each batch, based on target regions corresponding to the batch and to-be-scheduled goods corresponding to the target regions, one or more robots of which region attributes include the target regions corresponding to the batch and of which running states are the order-receivable state are determined as target robots corresponding to the batch, to process a task corresponding to the batch through target robots corresponding to each batch.

Step S607: determining the to-be-executed tasks of the target robots according to aisles to which the storage spaces corresponding to the to-be-scheduled goods belongs, to enable a span of aisles corresponding to to-be-scheduled goods in a to-be-executed task of each target robot to be less than a preset value.

The preset value may be 3, 5, or another value. Through the setting of the preset value, when extracting corresponding to-be-scheduled goods, the robot may cross fewer aisles, thereby reducing the walking distance of the robot and increasing goods processing efficiency.

Specifically, to avoid a case that one target robot crosses excess aisles during single-trip running, that is, during extraction of one or more pieces of corresponding to-be-scheduled goods, thereby causing the walking distance of the robot to be excessively long, when to-be-scheduled goods are assigned to each target robot, it is necessary to consider aisles to which storage spaces or storage locations of the to-be-scheduled goods belong, thereby preferentially assigning to-be-scheduled goods corresponding to the same aisle or as few as possible aisles to one target robot.

In this embodiment, after the to-be-scheduled goods of the task are determined, the physical partitions of the warehouse are divided based on the locations of the storage spaces of the to-be-scheduled goods, thereby obtaining the logic partitions. In the foregoing manner, results of logic partitions for different tasks may be different, thereby implementing a task-based dynamic partitioning policy and increasing partitioning flexibility of the warehousing system. The region attributes are set for the robots of the warehousing system based on the partition statuses of the logic partitions, thereby assigning a target robot to the task based on a target region in which the to-be-scheduled goods are located, running states of robots whose region attributes include the target region, the task load, and the task priority, implementing matching between a robot and a logic region corresponding to the task, and reducing the walking distance of the target robot when executing the task. Then, the to-be-executed task is assigned to each target robot based on aisles to which the storage spaces of the to-be-scheduled goods belong, thereby avoiding a case that the target robot needs to cross more aisles to extract the to-be-scheduled goods corresponding to the to-be-executed task, to further reduce the walking distance of the robot and increase task processing efficiency.

Figure 8:
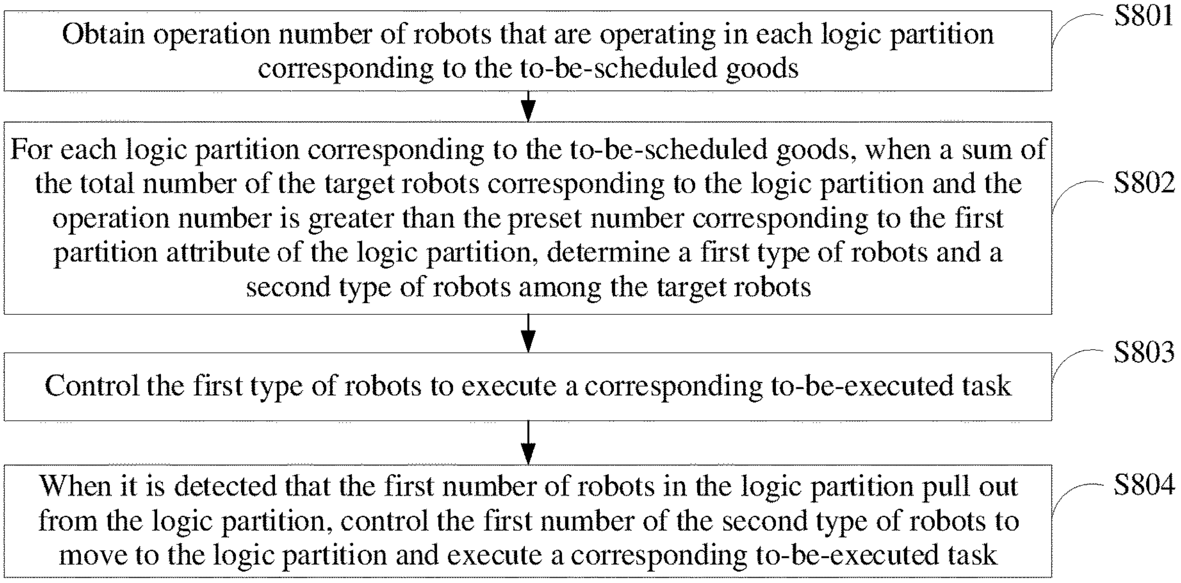
FIG. 8 is a flowchart of a task assigning method according to another embodiment of this application.

Optionally, FIG. 8 is a flowchart of a task assigning method according to another embodiment of this application. In this embodiment, a first partition attribute is set for each logic partition, and the first partition attribute is used for describing the preset number of robots allowed to operate at the same moment in the logic partition. As shown in FIG. 8, in this embodiment, based on the task assigning method provided in any one of the foregoing embodiments, after the determining the to-be-executed task of the target robots, the task assigning method may further include the following steps:

Step S801: obtaining operation number of robots that are operating in each logic partition corresponding to the to-be-scheduled goods.

Specifically, because the warehousing system receives different orders in a period of time, a case of executing a plurality of orders simultaneously exists. Therefore, before the foregoing at least one task is executed, robots that are operating may exist in one or more logic partitions corresponding to the at least one task, so that it is necessary to collect statistics on the number of robots that are operating in each logic partition corresponding to the at least one task, that is, the operation number in each logic partition corresponding to the to-be-scheduled goods.

In some embodiments, the operation number may be 0.

In some embodiments, step S801 may be executed after the determining the to-be-scheduled goods corresponding to the at least one task.

Step S802: for each logic partition corresponding to the to-be-scheduled goods, when a sum of the total number of the target robots corresponding to the logic partition and the operation number is greater than the preset number corresponding to the first partition attribute of the logic partition, determining a first type of robots and a second type of robots among the target robots.

A sum of the number of the first type of robots and the operation number is equal to the preset number, and the second type of robots are target robots remaining after excluding the first type of robots.

Specifically, when a sum of the number of robots that are operating in a logic partition, that is, the operation number and the total number of target robots is greater than a maximum number of robots that are allowed to operate in the logic partition, that is, the foregoing preset number, it is necessary to group the target robots, that is, divide the target robots into a first type of robots and a second type of robots, to avoid a case that the number of robots that operate simultaneously in the same logic partition is excessively large, to make collision prone to occur.

Step S803: controlling the first type of robots to execute a corresponding to-be-executed task.

Specifically, after the target robots are grouped, the first type of robots execute a to-be-executed task first corresponding to the first type of robots.

Step S804: when it is detected that the first number of robots in the logic partition pull out from the logic partition, controlling the first number of the second type of robots to move to the logic partition and execute a corresponding to-be-executed task.

The first number is the number of detected robots that pull out from the logic partition, the detected robots may be the first type of robots, or the foregoing robots that are operating, that is, robots that execute other operations in the logic partition, and the first number may be 1.

After the first type of robots are controlled to execute the corresponding to-be-executed task, that is, when the first type of robots executed the corresponding to-be-executed task, whether a robot pulling out from the logic partition exists in the logic partition is detected in real time. If yes, a second type of robots of which the number is equal to that of the robots pulling out from the logic partition are controlled to move to the logic partition, to execute the corresponding to-be-executed task, thereby increasing task processing efficiency while ensuring safety.

Figure 9:
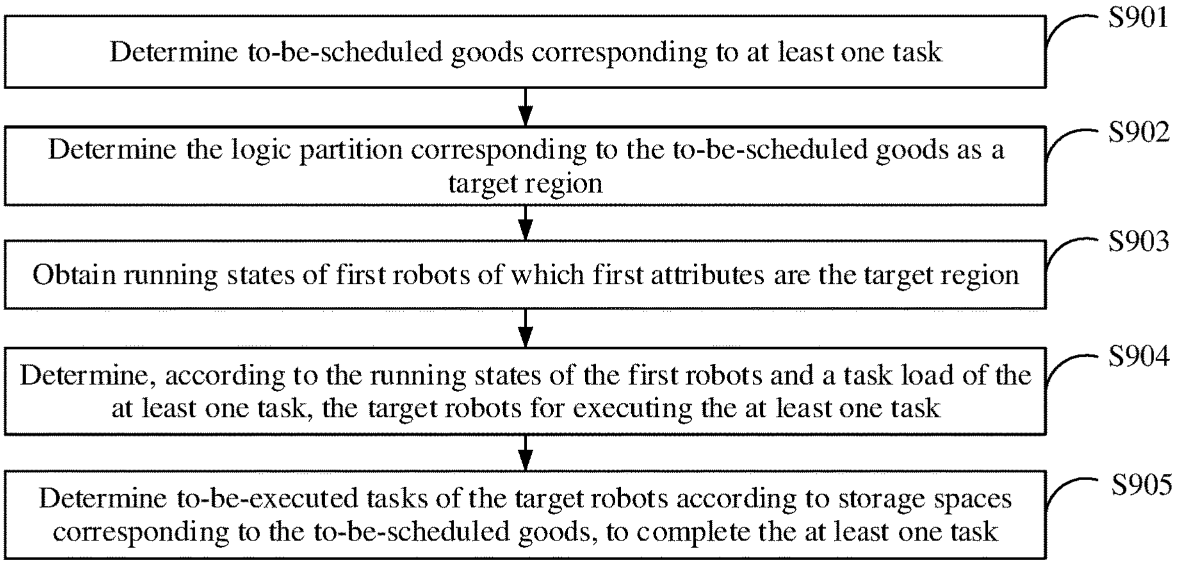
FIG. 9 is a flowchart of a task assigning method according to another embodiment of this application.

FIG. 9 is a flowchart of a task assigning method according to another embodiment of this application. In this embodiment, region attributes of robots include a first attribute, the first attribute is used for describing a logic partition to which a robot belongs in a life cycle of the robot, and the first attribute is an unmodifiable attribute. In the task assigning method provided in this embodiment, step S202 is further detailed based on the embodiment shown in FIG. 2. As shown in FIG. 9, The task assigning method provided in this embodiment includes the following steps:

Step S901: determining to-be-scheduled goods corresponding to at least one task.

Step S902: determining the logic partition corresponding to the to-be-scheduled goods as a target region.

Step S903: obtaining running states of first robots of which first attributes are the target region.

The first attribute may be set when a robot is initialized, and cannot be modified after the setting is completed, and the first attribute is used for describing a logic partition to which the robot always belongs, and is usually targeted at only one logic partition. In some embodiments, the first attribute may correspond to a plurality of logic partitions.

When a logic partition of the warehousing system is changed, an identifier of the original logic partition may be maintained, so that robots whose first attributes are the original logic partition may correspond to a new logic partition using the identifier of the original logic partition.

Specifically, after target regions are determined, the first attributes of the robots may be screened based on identifiers of the target regions, thereby obtaining first robots whose first attributes are at least one logic partition in the target regions, and obtaining running states of the first robots.

Step S904: determining, according to the running states of the first robots and a task load of the at least one task, the target robots for executing the at least one task.

Specifically, a receivable order load of the first robots, that is, the number of idle layers on the temporary storage rack may be determined based on the running states of the first robots, and then target robots used for executing the at least one task are determined based on the task load of the at least one task, the receivable order load of the first robots, and the logic partitions corresponding to the first attributes of the first robots.

Step S905: determining to-be-executed tasks of the target robots according to storage spaces corresponding to the to-be-scheduled goods, to complete the at least one task.

The storage spaces are spaces that are used for storing the goods and that are in the logic partition.

Specifically, after the target robots are determined, for target robots whose first attributes correspond to the same logic partition, the to-be-executed task of the target robots is determined based on the storage spaces corresponding to the to-be-scheduled goods in the logic partition.

In this embodiment, by setting a first attribute for robots during initialization, thereby determining logic partitions corresponding to the robots in a life cycle of the robots, when a task is assigned, it is preferentially considered that a target robot is determined according to the first attribute, thereby implementing partition management and goods processing, and increasing efficiency; and when to-be-scheduled goods in each logic partition are assigned, storage spaces of the to-be-scheduled goods are considered, and a to-be-executed task of target robots corresponding to the logic partition is specifically assigned, to enable to-be-scheduled goods processed by each target robot to be as concentrated as possible, thereby further reducing the walking journey of the robot when operating, and increasing goods processing efficiency.

Figure 10:
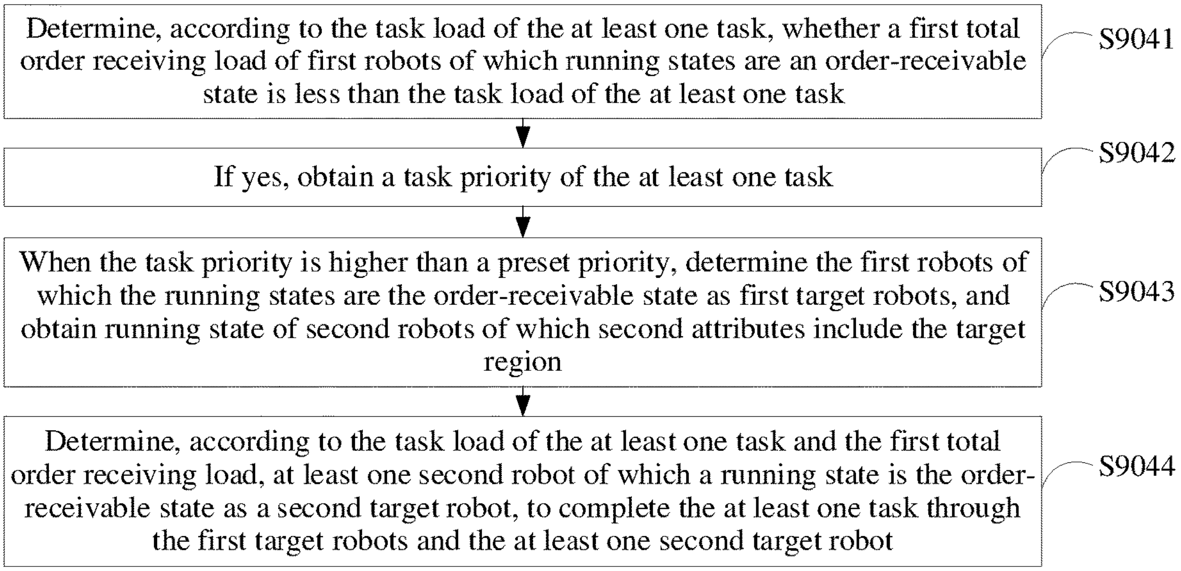
FIG. 10 is a flowchart of step S904 in the embodiment shown in FIG. 9 of this application.

Optionally, FIG. 10 is a flowchart of step S904 in the embodiment shown in FIG. 9 of this application. In this embodiment, region attributes of a robot further include a second attribute, the second attribute is used for describing one or more logic partitions to which the robot belongs, and the second attribute is a modifiable attribute. As shown in FIG. 10, step S904 may include the following steps:

Step S9041: determining, according to the task load of the at least one task, whether a first total order receiving load of first robots of which running states are an order-receivable state is less than the task load of the at least one task.

Specifically, statistics may be collected on a receivable order load of the first robots, then the first total order receiving load is obtained, and whether the first total order receiving load is less than the task load of the at least one task is determined; and if no, target robots are determined among the first robots, and to-be-executed tasks of the target robots are determined according to storage spaces corresponding to the to-be-scheduled goods, to complete the at least one task.

Step S9042: if yes, obtaining a task priority of the at least one task.

The task priority may be determined based on a priority of the order to which the task belongs or determined based on a deadline of the task, and a closer deadline indicates a higher priority.

In some embodiments, the task priority may include a total of five levels, for example, the first priority to the fifth priority.

Specifically, if the first total order receiving load is less than the task load of the at least one task, that is, the first robots cannot extract the to-be-scheduled goods in a single trip, it is necessary to assign a target robot to the at least one task with reference to the task priority.

Step S9043: when the task priority is higher than a preset priority, determining the first robots of which the running states are the order-receivable state as first target robots, and obtaining running state of second robots of which second attributes include the target region.

The preset priority may be a high priority, for example, the third priority. The second attribute is a modifiable attribute. To be specific, in subsequent operating, the second attribute of the robot may be modified or updated according to operating statuses of logic partitions.

Specifically, the second attribute of the robot is used for setting logic partitions in which the robot may operate, a value range of the second attribute of the robot may be used for describing a set of the logic partitions in which the robot may operate, and a value for setting the second attribute of the robot at a current time is used for describing one or more logic partitions in which the robot may operate at the current time.

For example, logic partitions included in a second attribute of a robot R91 are a logic partition 91 to a logic partition 95, indicating that the robot R91 may execute a task in any one or more of the logic partition 91 to the logic partition 95 by adjusting a value of the second attribute thereof, that is, a value range of the second attribute of the robot R91 is from the logic partition 91 to the logic partition 95, for example, the value range is from 91 to 95. For example, when the second attribute of the robot R91 is 93 and 95, it indicates that the robot R91 may process an order corresponding to the logic partition 93 and the logic partition 95 currently.

Specifically, when the task priority is high, that is, the at least one task is urgent, it is necessary to first determine the first robots of which the running states are the order-receivable state as target robots, that is, first target robots; and obtain second robots whose second attributes include or correspond to at least one logic partition in the target region, and obtain running state of the second robots.

Step S9044: determining, according to the task load of the at least one task and the first total order receiving load, at least one second robot of which a running state is the order-receivable state as a second target robot, to complete the at least one task through the first target robots and the at least one second target robot.

Each of the first target robot and the second target robot is the foregoing target robot.

Specifically, the second target robots may be determined among the second robots based on the second total order receiving load remaining after excluding the first total order receiving load from the task load of the at least one task, a receivable order load of the second robots in the order-receivable state, and the logic partitions corresponding to the second attributes of the second robots, to complete the at least one task through the first target robots and the second target robots.

By setting the second attributes of the robots, the region attributes of the robots are enriched, and task assigning flexibility of the warehousing system is increased.

Figure 11:
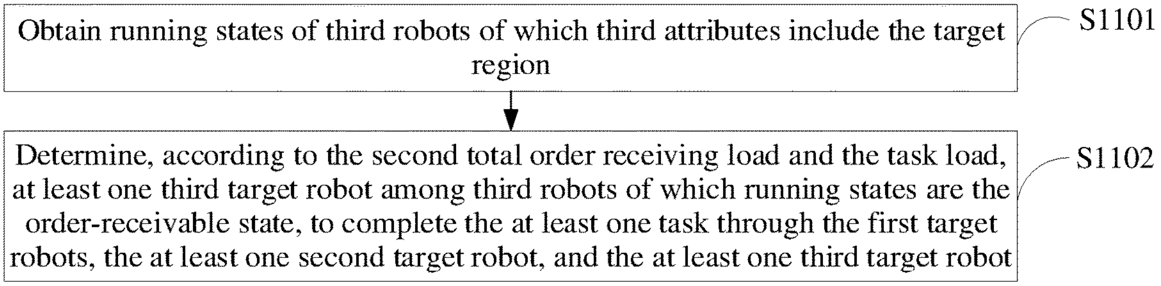
FIG. 11 is a flowchart of a task assigning method according to another embodiment of this application.

Optionally, FIG. 11 is a flowchart of a task assigning method according to another embodiment of this application. In this embodiment, region attributes of a robot further include a third attribute, and the third attribute is used for describing a logic partition that the robot is allowed to cross during single-trip running. This embodiment is based on the embodiment shown in FIG. 10. For a situation in which the second total order receiving load of the first target robots and the second target robots is less than the task load of the at least one task, the second total order receiving load is a sum of the first total order receiving load and the receivable order load of the second target robots. As shown in FIG. 11, when a second total order receiving load of the first target robots and the second target robot is less than the task load of the at least one target task, the task assigning method may further include the following steps:

Step S1101: obtaining running states of third robots of which third attributes include the target region.

The third attribute is a modifiable attribute, used for describing whether the robot may cross logic partitions during single-trip operating, for example, during picking, and logic partitions that may be crossed. The third attribute may be of a switch setting type. For example, when a value thereof is 0, it indicates that partitions cannot be crossed, and when a value thereof is 1, it indicates that partitions can be crossed. When the third attribute is of the switch setting type, logic partitions that the robot can cross may be determined based on the first attribute and the second attribute. The third attribute may alternatively be of a value setting type, to explicitly specify logic partitions that the robot can cross.

For example, the warehousing system includes three logic partitions: logic partitions L001 to L003. If a robot R11 has a first attribute of L002, a second attribute of L003, and a third attribute of 0, it indicates that the robot R11 may execute a task corresponding to the logic partition L002 or L003 during single-trip operating. If the robot R11 has a third attribute of 1, it indicates that the robot R11 may execute a task corresponding to the logic partitions L002 and L003 during single-trip operating.

Specifically, when the second total order receiving load corresponding to the first target robots and the second target robots still does not satisfy the task load of the at least one task, it is necessary to consider the third attributes of the robots. Specifically, third robots whose third attributes include at least one logic partition corresponding to the target regions are obtained, and running states of the third robots are obtained.

Step S1102: determining, according to the second total order receiving load and the task load, at least one third target robot among third robots of which running states are the order-receivable state, to complete the at least one task through the first target robots, the at least one second target robot, and the at least one third target robot.

Each of the first target robot, the second target robot, and the third target robot is the foregoing target robot.

Specifically, at least one third target robot may be determined, based on a task load remaining by excluding the second total order receiving load from the task load of the at least one task and the logic partitions involved in or included in the third attributes of the third robots, among third robots of which running states are the order-receivable state, thereby completing the at least one task through the first target robots, the second target robot, and the third target robot.

By setting the third attributes for the robots, the region attributes of the robots are further enriched, and task assigning flexibility of the warehousing system is increased. In addition, when the target robots are determined, task assigning reasonableness and scientificalness are increased based on the sequence of the first attribute, the second attribute, and the third attribute, and scheduling efficiency and goods processing efficiency of the warehousing system are increased.

Figure 12:
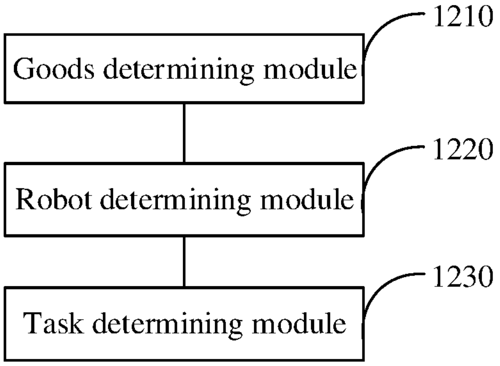
FIG. 12 is a schematic structural diagram of a task assigning apparatus according to an embodiment of this application.

FIG. 12 is a schematic structural diagram of a task assigning apparatus according to an embodiment of this application. As shown in FIG. 12, the apparatus is applied to a warehousing system, a warehouse of the warehousing system includes a plurality of logic partitions, each logic partition includes one or more physical regions, and the apparatus includes: a goods determining module 1210, a robot determining module 1220, and a task determining module 1230.

The goods determining module 1210 is configured to determine to-be-scheduled goods corresponding to at least one task; the robot determining module 1220 is configured to determine target robots according to a logic partition corresponding to the to-be-scheduled goods and a region attribute of each robot, where the region attribute is used for describing logic partitions corresponding to the robots; and the task determining module 1230 is configured to determine to-be-executed tasks of the target robots according to storage spaces corresponding to the to-be-scheduled goods, to complete the at least one task, where the storage spaces are spaces that are used for storing the goods and that are in the logic partition.

Optionally, the robot determining module 1220 includes:

a target region determining unit, configured to determine the logic partition corresponding to the to-be-scheduled goods as a target region; and a robot determining unit, configured to determine the target robots for executing the at least one task among the robots of which region attributes include the target region.

Optionally, the robot determining unit includes:

a robot state obtaining sub-unit, configured to obtain running states of the robots of which the region attributes include the target region; and a robot determining sub-unit, configured to determine, according to a task load of the at least one task and a task priority of the at least one task, the target robots for executing the at least one task among the robots of which the region attributes include the target region and of which running states are an order-receivable state.

Optionally, the region attribute includes a first attribute, the first attribute is used for describing a logic partition to which a robot belongs in a life cycle of the robot, and the first attribute is an unmodifiable attribute; the robot determining unit includes:

a first state obtaining sub-unit, configured to obtain running states of first robots of which first attributes are the target region; and a first robot determining sub-unit, configured to determine, according to the running states of the first robots and a task load of the at least one task, the target robots for executing the at least one task.

Optionally, the region attribute further includes a second attribute, the second attribute is used for describing one or more logic partitions to which the robot belongs, and the second attribute is a modifiable attribute; and the first robot determining sub-unit is specifically configured to:

determine, according to the task load of the at least one task, whether a first total order receiving load of first robots of which running states are an order-receivable state is less than the task load of the at least one task; if yes, obtain a task priority of the at least one task; when the task priority is higher than a preset priority, determine the first robots of which the running states are the order-receivable state as first target robots, and obtain running state of second robots of which second attributes include the target region; and determine, according to the task load of the at least one task and the first total order receiving load, at least one second robot of which a running state is the order-receivable state as a second target robot, to complete the at least one task through the first target robots and the second target robot.

Optionally, the region attribute further includes a third attribute, the third attribute is used for describing a logic partition that the robot is allowed to cross during single-trip running, and when a second total order receiving load of the first target robots and the second target robot is less than the task load of the at least one task, the robot determining unit further includes:

a third robot determining sub-unit, configured to: obtain running states of third robots of which third attributes include the target region; and determine, according to the second total order receiving load and the task load, at least one third target robot among third robots of which running states are the order-receivable state, to complete the at least one task through the first target robots, the second target robot, and the third target robot.

Optionally, the logic partition includes a first partition attribute, and the first partition attribute is used for describing the preset number of robots allowed to operate at the same moment in the logic partition; and the apparatus further includes:

an operation number obtaining module, configured to obtain the operation number of robots that are operating in each logic partition corresponding to the to-be-scheduled goods; a robot classification module, configured to, for each logic partition corresponding to the to-be-scheduled goods, when a sum of the total number of the target robots corresponding to the logic partition and the operation number is greater than the preset number corresponding to the first partition attribute of the logic partition, determine a first type of robots and a second type of robots among the target robots, where a sum of the number of the first type of robots and the operation number is equal to the preset number, and the second type of robots are target robots remaining after excluding the first type of robots; a first-type robot control module, configured to control the first type of robots to execute a corresponding to-be-executed task; and a second-type robot control module, configured to, when it is detected that the first number of robots in the logic partition pull out from the logic partition, control the first number of the second type of robots to move to the logic partition and execute a corresponding to-be-executed task.

Optionally, the apparatus further includes:

a logic partitioning module, configured to divide physical regions of the warehouse according to locations of the storage spaces of the to-be-scheduled goods corresponding to the at least one task, to determine logic partitions of the warehousing system; and a region attribute setting module, configured to set a region attribute of each robot according to the logic partitions.

Optionally, the task determining module 1230 is specifically configured to:

determine the to-be-executed tasks of the target robots according to aisles to which the storage spaces corresponding to the to-be-scheduled goods belongs, to enable a span of aisles corresponding to to-be-scheduled goods in a to-be-executed task of each target robot to be less than a preset value.

Optionally, the apparatus further includes:

a task dividing module, configured to: receive an order before the to-be-scheduled goods corresponding to the at least one task are determined; and determine the at least one task according to the order; and a work station determining module, configured to determine one or more target work stations according to task demands of the at least one task, logic partitions corresponding to work stations, and goods storage statuses of the logic partitions, where goods satisfying the task demands of the at least one task are stored in a logic partition corresponding to the one or more target workstations; and the goods determining module is specifically configured to determine the to-be-scheduled goods of the at least one task in the logic partition corresponding to the target work station according to the task demands of the at least one task.

The task assigning apparatus provided in this embodiment of this application can perform the task assigning method provided in any embodiment of this application, and has corresponding functional modules for performing the method and beneficial effects thereof.

Figure 13:
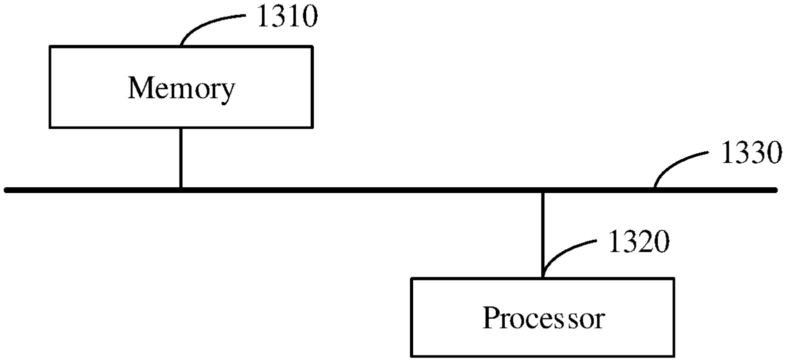
FIG. 13 is a schematic structural diagram of a task assigning device according to an embodiment of this application.

FIG. 13 is a schematic structural diagram of a task assigning device according to an embodiment of this application. As shown in FIG. 13, the task assigning device includes: a memory 1310, a processor 1320, and a computer program.

The computer program is stored in the memory 1310, and configured to be executed by the processor 1320 to implement the task assigning method provided in any one of the embodiments corresponding to FIG. 2, FIG. 5, FIG. 6, and FIG. 8 to FIG. 11 of this application.

The memory 1310 and the processor 1320 are connected to each other through a bus 1330.

Relevant descriptions can be understood by correspondingly referring to the relevant descriptions and effects corresponding to the steps in FIG. 2, FIG. 5, FIG. 6, and FIG. 8 to FIG. 11. Details are not repeated here.

Figure 14:
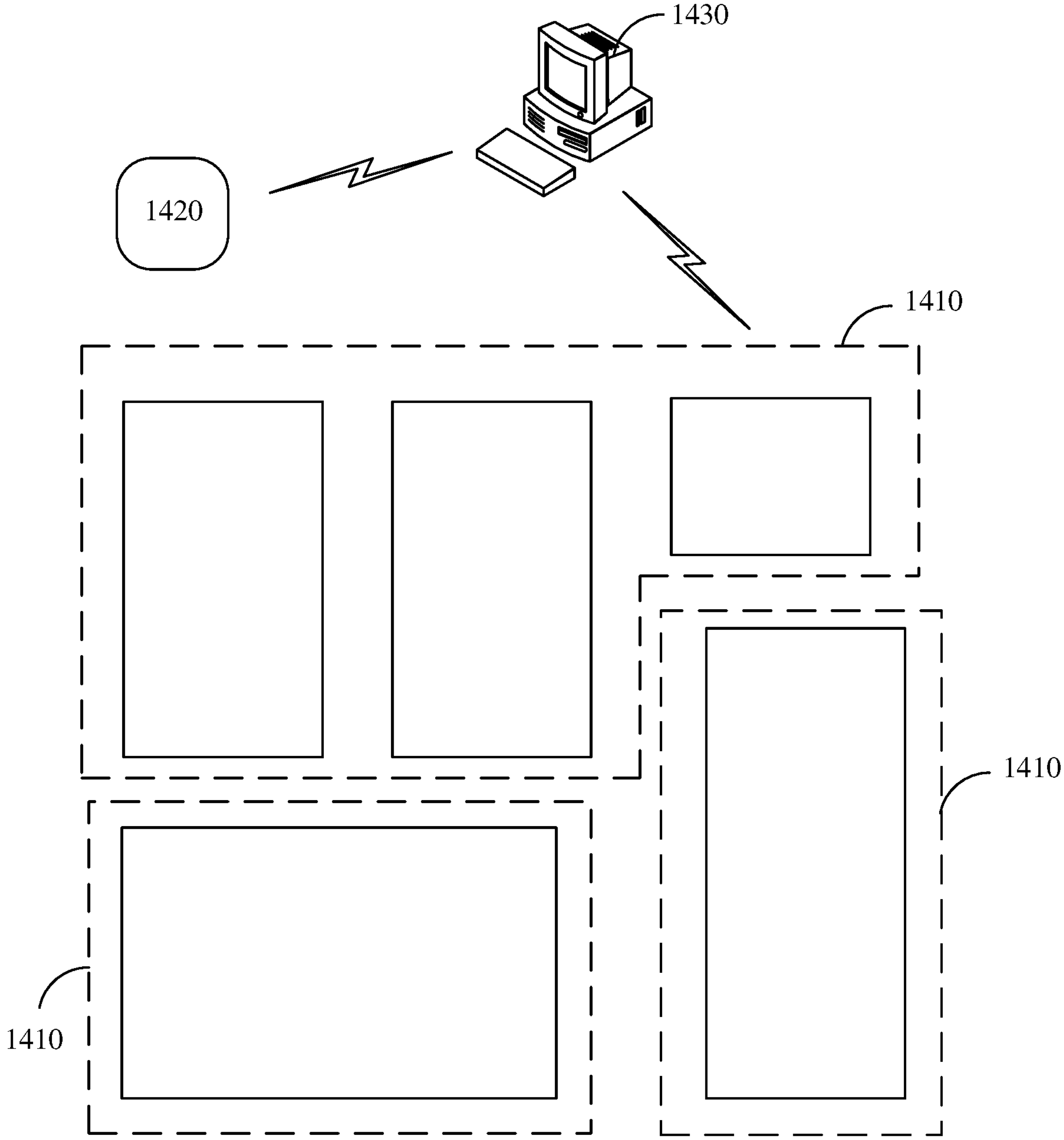
FIG. 14 is a schematic structural diagram of a warehousing system according to an embodiment of this application.

FIG. 14 is a schematic structural diagram of a warehousing system according to an embodiment of this application. As shown in FIG. 14, the warehousing system includes: a warehouse including a plurality of logic partitions 1410, a robot 1420, and a task assigning device 1430.

The task assigning device 1430 is the task assigning device provided in the embodiment shown in FIG. 13 of this application. Each logic partition 1410 includes one or more physical regions, used for storing goods, and a solid-line block represents a physical region in FIG. 14.

In some embodiments, the warehousing system further includes apparatuses such as a workstation, an unloader, a hoister, and a transport line.

One embodiment of this application provides a computer-readable storage medium, having a computer program stored thereon, where the computer program is executed by a processor to implement the task assigning method provided in any one of the embodiments corresponding to FIG. 2, FIG. 5, FIG. 6, and FIG. 8 to FIG. 11 of this application.

The computer readable storage medium can be a ROM, a random access memory (RAM), a CD-ROM, a magnetic tape, a floppy disk, an optical data storage device, or the like.

This application further provides a program product, including an executable computer program, where the executable computer program is stored in a readable storage medium. At least one processor of the task assigning device or warehousing system may read the computer program from the readable storage medium, and the at least one processor executes the computer program, to cause the task assigning apparatus to implement the task assigning method provided in the foregoing implementations.

In the several embodiments provided in this application, it should be understood that the disclosed device and method may be implemented in other manners. For example, the device embodiments described above are merely exemplary. For example, module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be electrical, mechanical, or in other forms.

The modules described as separate parts may or may not be physically separate, and components displayed as modules may or may not be physical units, that is, may be located in one position, or may be distributed on a plurality of network units. Some or all of the modules may be selected according to actual needs to achieve the objectives of the solutions of the embodiments.

In addition, functional modules in embodiments of this application may be integrated into one processing unit, each of the modules may exist alone physically, or two or more modules are integrated into one unit. The integrated unit may be implemented in the form of hardware, or may be implemented in a form of a hardware plus software functional unit.

When the foregoing integrated module is implemented in a form of a software functional module, the integrated unit may be stored in a computer-readable storage medium. The software functional module is stored in a storage medium and includes several instructions for enabling a computer device (which may be a personal computer, a server, or a network device) or a processor (English: processor) to perform some of the steps of the methods described in the embodiments of this application.

It should be understood that the processor may be a central processing unit (Central Processing Unit, CPU for short), or may be another general processor, a digital signal processor (Digital Signal Processor, DSP for short), an application specific integrated circuit (Application Specific Integrated Circuit, ASIC for short), or the like. The general-purpose processor may be a microprocessor, or the processor may be any conventional processor or the like. Steps of the methods disclosed with reference to this application may be directly performed and completed by a hardware processor, or may be performed and completed by using a combination of hardware and a software module in the processor.

The memory may include a high-speed RAM memory, or may further include a non-volatile memory NVM, for example, at least one magnetic disk storage, or may be a USB flash disk, a mobile hard disk, a read-only memory, a magnetic disk, or an optical disc.

The bus may be an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, or the like. The bus may be classified into an address bus, a data bus, a control bus, or the like. For ease of indication, the bus in the accompanying drawings of this application is not limited to only one bus or only one type of bus.

The storage medium can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc. The storage medium may be any available medium accessible to a general-purpose or dedicated computer.

For example, a storage medium is coupled to a processor, so that the processor can read information from the storage medium or write information into the storage medium. Certainly, the storage medium may alternatively be a component of the processor. The processor and the storage medium may be located in an application-specific integrated circuit (Application-Specific Integrated Circuit, ASIC for short). Certainly, the processor and the storage medium may alternatively exist in an electronic device or a main control device as discrete components.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a ROM, a RAM, a magnetic disk, or an optical disc.

Finally, the foregoing embodiments are merely used for describing the technical solutions of this application, rather than limiting this application. Although this application is described in detail with reference to the foregoing embodiments, a person of ordinary skill in the art is to understand that they can still make modifications to the technical solutions described in the foregoing embodiments or make equivalent replacements on some or all of technical features therein. These modifications or replacements do not cause the essence of the corresponding technical solutions to depart from the scope of the technical solutions of the embodiments of this application.

The invention claimed is:

1. A task assigning method, wherein the method is applied to a warehousing system, a warehouse of the warehousing system comprises robots and a plurality of partitions, each robot is configured with a region attribute, and the region attribute is used for describing partitions in which the robots are allowed to execute tasks; and the method comprises:

determining to-be-scheduled goods corresponding to at least one target task;

determining, according to a partition corresponding to the to-be-scheduled goods and region attributes of the robots, target robots for executing the at least one target task;

determining to-be-executed tasks of the target robots according to storage spaces corresponding to the to-be-scheduled goods, to complete the at least one task, wherein the storage spaces are spaces that are used for storing the to-be-scheduled goods and that are in the partition; and controlling the target robots to execute the at least one target task;

wherein before the determining the to-be-scheduled goods corresponding to the at least one target task, the method further comprises:

receiving an order;

determining the at least one target task according to the order; and determining one or more target work stations according to task demands of the at least one target task, partitions corresponding to the one or more work stations, and goods storage statuses of the partitions, wherein goods satisfying the task demands of the at least one target task are stored in a partition corresponding to the one or more target work stations; and correspondingly, the determining the to-be-scheduled goods corresponding to the at least one target task comprises:

determining the to-be-scheduled goods of the at least one target task in the partition corresponding to the target work station according to the task demands of the at least one target task.

2. The method according to claim 1, wherein the determining, according to the partition corresponding to the to-be-scheduled goods and the region attributes of the robots, the target robots for executing the at least one target task comprises:

determining the partition corresponding to the to-be-scheduled goods as a target region; and determining the target robots for executing the at least one target task among the robots of which the region attributes comprise the target region.

3. The method according to claim 2, wherein the determining the target robots for executing the at least one target task among the robots of which the region attributes comprise the target region comprises:

obtaining running states of the robots of which the region attributes comprise the target region; and determining, according to a task load of the at least one target task and a task priority of the at least one target task, the target robots for executing the at least one target task among the robots of which the region attributes comprise the target region and of which running states are an order-receivable state.

4. The method according to claim 2, wherein the region attribute comprises a first attribute, the first attribute is used for describing a partition to which a robot belongs in a life cycle of the robot, and the first attribute is an unmodifiable attribute;

the determining the target robots for executing the at least one target task among the robots of which the region attributes comprise the target region comprises:

obtaining running states of first robots of which first attributes are the target region; and determining, according to the running states of the first robots and a task load of the at least one target task, the target robots for executing the at least one target task.

5. The method according to claim 4, wherein the region attribute further comprises a second attribute, the second attribute is used for describing one or more partitions to which the robot belongs, and the second attribute is a modifiable attribute; and the determining, according to the running states of the first robots and the task load of the at least one target task, the target robots for executing the at least one target task comprises:

determining, according to the task load of the at least one target task, whether a first total order receiving load of first robots of which running states are an order-receivable state is less than the task load of the at least one target task;

if yes, obtaining a task priority of the at least one target task;

when the task priority is higher than a preset priority, determining the first robots of which the running states are the order-receivable state as first target robots, and obtaining running states of second robots of which second attributes comprise the target region; and determining, according to the task load of the at least one target task and the first total order receiving load, at least one second robot of which a running state is the order-receivable state as a second target robot, to complete the at least one target task through the first target robots and the at least one second target robot; and wherein the controlling the target robots to execute the at least one target task comprises: controlling the first target robots and the at least one second target robot to execute the at least one target task.

6. The method according to claim 5, wherein the region attribute further comprises a third attribute, the third attribute is used for describing a partition that the robot is allowed to cross during single-trip running, and when a second total order receiving load of the first target robots and the second target robot is less than the task load of the at least one target task, the method further comprises:

obtaining running states of third robots of which third attributes comprise the target region; and determining, according to the second total order receiving load and the task load, at least one third target robot among third robots of which running states are the order-receivable state, to complete the at least one target task through the first target robots, the at least one second target robot, and the at least one third target robot; and wherein the controlling the first target robots and the at least one second target robot to execute the at least one target task comprises: controlling the first target robots, the at least one second target robot and the at least one third target robot to execute the at least one target task.

7. The method according to claim 1, wherein the at least one target task comprises only one target task, and the determining, according to the partition corresponding to the to-be-scheduled goods and the region attributes of the robots, the target robots for executing the at least one target task comprises:

determining the partition corresponding to the to-be-scheduled goods as a target region; and determining, according to the storage spaces corresponding to the to-be-scheduled goods, a target robot for executing the target task among the robots of which the region attributes comprise the target region, wherein a to-be-executed task of the target robot comprises the to-be-scheduled goods.

8. The method according to claim 1, wherein the partition comprises a first partition attribute, and the first partition attribute is used for describing a preset number of robots allowed to operate at the same moment in the partition; and the method further comprises:

obtaining operation number of robots that are operating to execute another task in each partition corresponding to the to-be-scheduled goods;

for each partition corresponding to the to-be-scheduled goods, when a sum of the total number of the target robots corresponding to the partition and the operation number is greater than the preset number corresponding to the first partition attribute of the partition, determining a first type of robots and a second type of robots among the target robots, wherein a sum of the number of the first type of robots and the operation number is equal to the preset number, and the second type of robots are target robots remaining after excluding the first type of robots;

controlling the first type of robots to execute a corresponding to-be-executed task; and when it is detected that a first number of robots in the partition pull out from the partition, controlling the first number of the second type of robots to move to the partition and execute a corresponding to-be-executed task.

9. The method according to claim 1, wherein the method further comprises:

dividing a region of the warehouse according to locations of the storage spaces of the to-be-scheduled goods corresponding to the at least one target task, to determine partitions of the warehousing system; and setting the region attribute of each robot according to the partitions.

10. The method according to claim 1, wherein the determining the to-be-executed tasks of the target robots according to the storage spaces corresponding to the to-be-scheduled goods comprises:

determining the to-be-executed tasks of the target robots according to aisles to which the storage spaces corresponding to the to-be-scheduled goods belongs, to enable a span of aisles corresponding to to-be-scheduled goods in a to-be-executed task of each target robot to be less than a preset value.

11. A task assigning device, wherein the device is applied to a warehousing system, a warehouse of the warehousing system comprises robots and a plurality of partitions, each robot is configured with a region attribute, and the region attribute is used for describing partitions in which the robots are allowed to execute tasks; and the device comprises:

a memory and at least one processor, wherein the memory stores computer-executable instructions; and the at least one processor is configured to execute the computer-executable instructions stored in the memory, wherein when the computer-executable instructions are executed by the at least one processor, the at least one processor is configured to:

determine to-be-scheduled goods corresponding to at least one target task;

determine, according to a partition corresponding to the to-be-scheduled goods and region attributes of the robots, target robots for executing the at least one target task;

determine to-be-executed tasks of the target robots according to storage spaces corresponding to the to-be-scheduled goods, to complete the at least one task, wherein the storage spaces are spaces that are used for storing the to-be-scheduled goods and that are in the partition; and control the target robots to execute the at least one target task;

wherein the at least one processor is further configured to:

determine the partition corresponding to the to-be-scheduled goods as a target region; and determine the target robots for executing the at least one target task among the robots of which the region attributes comprise the target region;

wherein the region attribute comprises a first attribute, the first attribute is used for describing a partition to which a robot belongs in a life cycle of the robot, and the first attribute is an unmodifiable attribute;

wherein the at least one processor is further configured to:

obtain running states of first robots of which first attributes are the target region; and determine, according to the running states of the first robots and a task load of the at least one target task, the target robots for executing the at least one target task;

wherein the region attribute further comprises a second attribute, the second attribute is used for describing one or more partitions to which the robot belongs, and the second attribute is a modifiable attribute; and wherein the at least one processor is further configured to:

determine, according to the task load of the at least one target task, whether a first total order receiving load of first robots of which running states are an order-receivable state is less than the task load of the at least one target task;

if yes, obtain a task priority of the at least one target task;

when the task priority is higher than a preset priority, determine the first robots of which the running states are the order-receivable state as first target robots, and obtain running states of second robots of which second attributes comprise the target region; and determine, according to the task load of the at least one target task and the first total order receiving load, at least one second robot of which a running state is the order-receivable state as a second target robot, to complete the at least one target task through the first target robots and the at least one second target robot; and wherein the at least one processor is further configured to control the first target robots and the at least one second target robot to execute the at least one target task.

12. The device according to claim 11, wherein the region attribute further comprises a third attribute, the third attribute is used for describing a partition that the robot is allowed to cross during single-trip running, and when a second total order receiving load of the first target robots and the second target robot is less than the task load of the at least one target task, and the at least one processor is further configured to:

obtain running states of third robots of which third attributes comprise the target region; and determine, according to the second total order receiving load and the task load, at least one third target robot among third robots of which running states are the order-receivable state, to complete the at least one target task through the first target robots, the at least one second target robot, and the at least one third target robot; and wherein the at least one processor is further configured to control the first target robots, the at least one second target robot and the at least one third target robot to execute the at least one target task.

13. The device according to claim 11, wherein the partition comprises a first partition attribute, and the first partition attribute is used for describing a preset number of robots allowed to operate at the same moment in the partition; and the at least one processor is further configured to:

obtain operation number of robots that are operating to execute another task in each partition corresponding to the to-be-scheduled goods;

for each partition corresponding to the to-be-scheduled goods, when a sum of the total number of the target robots corresponding to the partition and the operation number is greater than the preset number corresponding to the first partition attribute of the partition, determine a first type of robots and a second type of robots among the target robots, wherein a sum of the number of the first type of robots and the operation number is equal to the preset number, and the second type of robots are target robots remaining after excluding the first type of robots;

control the first type of robots to execute a corresponding to-be-executed task; and when it is detected that a first number of robots in the partition pull out from the partition, control the first number of the second type of robots to move to the partition and execute a corresponding to-be-executed task.

14. The device according to claim 11, wherein the at least one processor is further configured to:

divide a region of the warehouse according to locations of the storage spaces of the to-be-scheduled goods corresponding to the at least one target task, to determine partitions of the warehousing system; and set the region attribute of each robot according to the partitions.

15. The device according to claim 11, wherein the at least one processor is further configured to:

determine the to-be-executed tasks of the target robots according to aisles to which the storage spaces corresponding to the to-be-scheduled goods belongs, to enable a span of aisles corresponding to to-be-scheduled goods in a to-be-executed task of each target robot to be less than a preset value.

16. A warehousing system, comprising: robots, a warehouse comprising a plurality of partitions, each robot is configured with a region attribute, and the region attribute is used for describing partitions in which the robots are allowed to execute tasks, and a task assigning device, wherein the task assigning device comprises:

a memory and at least one processor, wherein the memory stores computer-executable instructions; and the at least one processor is configured to execute the computer-executable instructions stored in the memory, wherein when the computer-executable instructions are executed by the at least one processor, the at least one processor is configured to:

determine to-be-scheduled goods corresponding to at least one target task;

determine, according to a partition corresponding to the to-be-scheduled goods and region attributes of the robots, target robots for executing the at least one target task;

determine to-be-executed tasks of the target robots according to storage spaces corresponding to the to-be-scheduled goods, to complete the at least one task, wherein the storage spaces are spaces that are used for storing the to-be-scheduled goods and that are in the partition; and control the target robots to execute the at least one target task;

wherein before the at least one processor determines the to-be-scheduled goods corresponding to the at least one target task, the at least one processor is further configured to:

receive an order;

determine the at least one target task according to the order; and determine one or more target work stations according to task demands of the at least one target task, partitions corresponding to the one or more work stations, and goods storage statuses of the partitions, wherein goods satisfying the task demands of the at least one target task are stored in a partition corresponding to the one or more target work stations; and correspondingly, when the at least one processor determines the to-be-scheduled goods corresponding to the at least one target task, the at least one processor is further configured to:

determine the to-be-scheduled goods of the at least one target task in the partition corresponding to the target work station according to the task demands of the at least one target task.

* * * * *